US006620048B2

(12) United States Patent
Gillmann et al.

(10) Patent No.: US 6,620,048 B2
(45) Date of Patent: Sep. 16, 2003

(54) APPARATUS FOR DAMPING TORSIONAL VIBRATIONS

(75) Inventors: Achinm Gillmann, Bühl-Altschweier (DE); Ad Kooy, Lauf (NL); Dietmar Strauss, Bühl (DE); Johann Jäckel, Baden-Baden (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/915,817

(22) Filed: Jul. 25, 2001

(65) Prior Publication Data

US 2002/0032061 A1 Mar. 14, 2002

(30) Foreign Application Priority Data

Jul. 27, 2000 (DE) .......................... 100 37 107

(51) Int. Cl.⁷ ............... F16D 3/12; F16D 3/14
(52) U.S. Cl. ............ 464/68; 464/7; 192/208; 192/113.5
(58) Field of Search ............ 464/7, 68; 192/55.4, 192/208, 212, 113.5

(56) References Cited

U.S. PATENT DOCUMENTS

| 5,150,777 | A |   | 9/1992  | Friedmann |
| 5,160,007 | A |   | 11/1992 | Reik et al. |
| 5,161,660 | A |   | 11/1992 | Huber |
| 5,261,516 | A |   | 11/1993 | Friedmann |
| 5,382,193 | A |   | 1/1995  | Friedmann et al. |
| 5,624,317 | A | * | 4/1997  | Schierling et al. ............ 464/68 |
| 5,681,221 | A |   | 10/1997 | Albers et al. |
| 5,720,475 | A | * | 2/1998  | Duclos .................. 192/201 |
| 5,784,928 | A | * | 7/1998  | Mokdad et al. .......... 192/55.61 |
| 5,911,628 | A | * | 6/1999  | Sudau et al. ............ 192/212 |
| 5,931,735 | A | * | 8/1999  | Schierling ............. 192/208 |
| 6,119,839 | A | * | 9/2000  | Jackel et al. ............ 192/205 |
| 6,129,192 | A |   | 10/2000 | Jackel et al. |
| 6,131,487 | A |   | 10/2000 | Jackel et al. |
| 6,213,270 | B1 |  | 4/2001  | Jackel et al. |
| 6,217,451 | B1 |  | 4/2001  | Kooy et al. |
| 2002/0046916 | A1 | * | 4/2002 | Peinemann et al. ...... 192/70.17 |

FOREIGN PATENT DOCUMENTS

| DE | 41 17 584 A1 | 12/1991 |
| DE | 196 48 342 A1 | 6/1997 |
| DE | 199 12 970 A1 | 9/1999 |
| DE | 10110671 A1 * | 9/2002 |

* cited by examiner

Primary Examiner—Lynne H. Browne
Assistant Examiner—Aaron Dunwoody
(74) Attorney, Agent, or Firm—Darby & Darby

(57) ABSTRACT

Apparatus for transmission of torque in the power train of a motor vehicle has coaxial rotary first and second torque transmitting devices, each of which can constitute a simple or a composite flywheel, and a torsional vibration damper operating between the two devices. The damper is installed in an annular chamber which is sealed at its periphery and is flanked by two sidewalls of the first torque transmitting device. The damper includes a washer-like partition which is affixed to the second torque transmitting device and has arms extending radially outwardly into the chamber. The radially inner part of the annular chamber is sealed by annular seals having annular carriers borne by the sidewalls at opposite sides of the partition, and deformable annular lips secured to the carriers and bearing upon the respective sides of the partition. The carriers and the lips consist of different materials and the seals serve to prevent penetration of impurities into and/or the escape of lubricant from the chamber. Such lubricant is in contact with coil springs which form part of the damper and oppose rotation of the torque transmitting devices relative to each other.

29 Claims, 1 Drawing Sheet

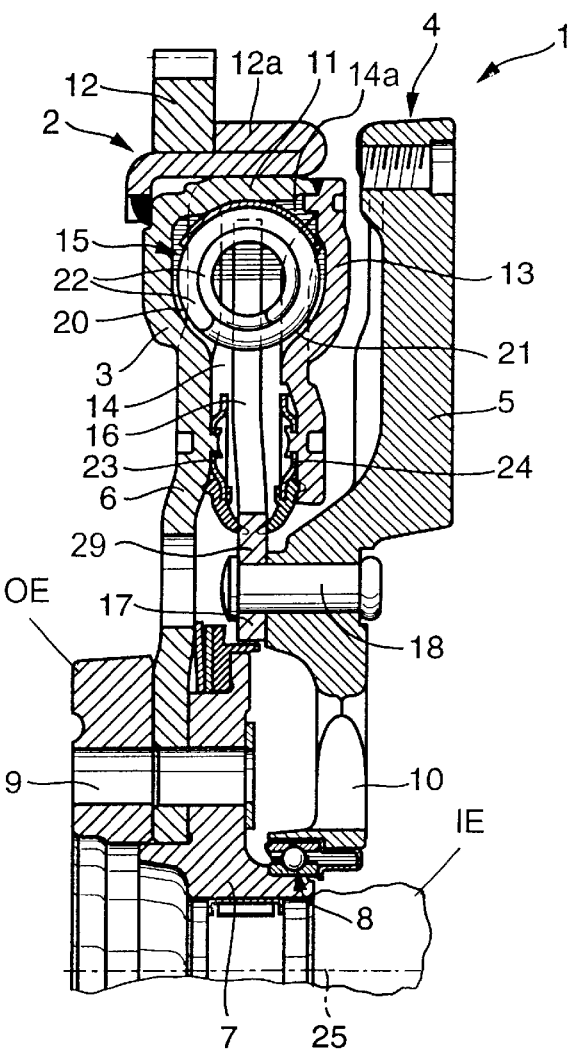
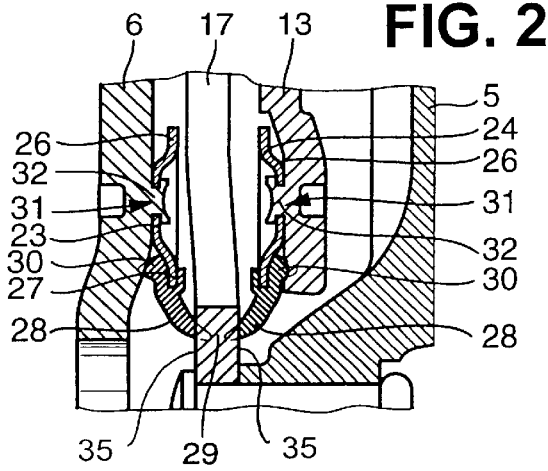
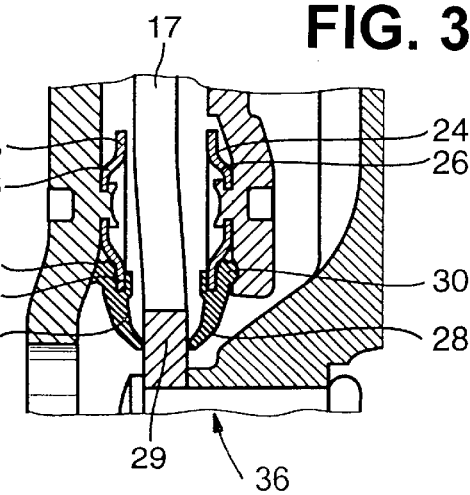

APPARATUS FOR DAMPING TORSIONAL VIBRATIONS

CROSS-REFERENCE TO RELATED CASES

This application claims the priority of the commonly owned copending German patent application Serial No. 100 37 107.8 filed Jul. 27, 2000. The disclosure of the above-referenced German patent application, as well as that of each US and foreign patent and patent application identified in the specification of the present application, is incorporated herein by reference.

BACKGROUND OF THE INVENTION

The invention relates to improvements in apparatus for damping vibrations between rotary driving and driven parts, such as between the output shaft of an engine or another prime mover and the input shaft of a change-speed transmission in the power train of a motor vehicle. As a rule, such apparatus comprise first and second rotary torque transmitting devices and a torque transmitting and vibration damping unit between such devices.

Torsional vibration damping apparatus of the character to which the apparatus of the present invention pertains are disclosed, for example, in published German patent applications Nos. 199 12 970 A1, 199 09 044 A1, 196 48 432 A1, 196 03 248 A1 and 41 17 584 A1. All such parts or groups of parts in the apparatus of the present invention which are adequately disclosed and illustrated in the above-enumerated and other published German patent applications as well as in US and foreign patents granted to the assignee of the present application and/or others will be described only to the extent necessary to readily locate the relevant references for additional disclosure (if necessary).

A drawback of presently known torsional vibration damping apparatus is that they are not effective under any and all circumstances which arise in torque transmitting machines, assemblies or apparatus, as well as that they are in part too bulky, complex and expensive. Moreover, many (if not all) presently known torsional vibration damping apparatus are overly sensitive to the presence and influence of foreign matter, mainly or often because their sensitive parts are not adequately shielded against penetration of impurities and/or against uncontrolled escape of lubricant.

OBJECTS OF THE INVENTION

An object of the present invention is to enhance the simplicity and reliability as well as to reduce the initial and maintenance cost of torsional vibration damping apparatus, for example, of apparatus which can be put to use in the power trains of motor vehicles.

Another object of the invention is to provide torsional vibration damping apparatus which can be installed in existing power trains as superior substitutes for conventional apparatus of such character.

A further object of the invention is to provide novel and improved means for reliably confining lubricant in the enclosure for the torsional vibration damper in the above outlined apparatus.

An additional object of the invention is to provide novel and improved means for shielding the sensitive constituents of torsional vibration damping apparatus from adverse influences of dust and/or other foreign matter.

Still another object of the instant invention is to provide novel and improved seals for use in torsional vibration damping apparatus of the above outlined character.

A further object of the invention is to provide a power train, particularly for use in a motor vehicle, which embodies a torsional vibration damping apparatus of the above outlined character.

Another object of the invention is to provide a novel and improved apparatus which is designed to transmit torque between the rotary output element of the engine and the rotary input element of the transmission in the power train of a motor vehicle, such as a passenger car, a truck, an SUV and/or others.

SUMMARY OF THE INVENTION

The invention resides in the provision of an apparatus for damping vibrations between coaxial rotary input and output elements, such as between the crankshaft or the camshaft of an internal combustion engine and the input shaft of the transmission in the power train of a motor vehicle. The improved apparatus comprises a first rotary torque transmitting device which is coaxial with and is arranged to receive torque from the output element, and a second rotary torque transmitting device which is coaxial with and is arranged to transmit torque to the input element. One of the two torque transmitting devices comprises at least two sidewalls which are rotatable with each other and bound (such as flank) an annular chamber having a sealed radially outer part and a radially inner part which is sealed in accordance with an important feature of the present invention. The apparatus further comprises a partition including a radially outer section in the chamber and a ring-shaped radially inner section extending substantially radially inwardly beyond the inner part of the chamber and being connected with the other of the two torque transmitting devices, energy storing means provided in the chamber and arranged to yieldably oppose rotation of the one torque transmitting device and the partition (i.e., the other torque transmitting device) relative to each other, and means for sealing the inner part of the chamber. Such sealing means comprises at least one annular carrier borne by one of the sidewalls and a deformable annular sealing lip provided on the carrier and sealingly engaging the ring-shaped inner section of the partition. The carrier consists of a first material, and the lip consists of a different second material (i.e., of a material other than that of the carrier).

The lip sealingly engages a first side of the inner section of the partition and the sealing means can further include an additional carrier which is borne by the other sidewall as well as an additional deformable annular sealing lip provided on the additional carrier and sealingly engaging a second side of the inner section of the partition. The additional carrier consists or can consist of the aforementioned first material, and the additional lip consists or can consist of the second material. The carriers and the lips are (or can be) respectively mirror images of each other with reference to a plane which is normal to the common axis of the torque transmitting devices.

Each carrier can include radially inner and radially outer portions and each lip can be provided on the radially inner annular portion of the respective carrier.

Each lip can be of one piece with the respective carrier.

Each lip is or can be deformed as a result of sealing engagement with the ring-shaped inner section of the partition, and each lip can include at least one at least substantially frustoconical or at least substantially dished portion at least in the underformed condition of such lip.

Each lip can include an annular portion which is in sealing engagement with the inner section of the partition and is offset relative to the respective carrier in the direction of the common axis of the torque transmitting devices.

Each lip and/or the respective carrier can include at least one annular bead at the respective sidewall. Each bead is deformable and can sealingly engage and is deformed by the respective sidewall.

The second material (of the lip or lips) is or can be elastic so that each such lip can be deformed by the respective sidewall in the direction of the common axis of the torque transmitting devices.

At least the one torque transmitting device is normally rotatable at a plurality of different speeds and each lip is or can be configured to undergo progressing deformation under the action of centrifugal force in response to increasing speed of the one torque transmitting device. Each such lip is or can be arranged to undergo progressing deformation axially and/or radially of the sidewalls in response to increasing rotational speed of the one torque transmitting device.

Each carrier can be fixedly secured (such as welded or otherwise bonded) to the respective sidewall. The sealing means can include separately produced means for connecting each carrier to the respective sidewall. Such connecting means can include one or more rivets, e.g., rivets which are of one piece with the respective carrier and/or with the respective sidewall.

The material of the lip or lips can be a plastic material, e.g., an elastomer including rubber, fluorocaoutchouc, fluorosilicon caoutchouc, silicone caoutchouc or the like.

The material of each lip can have a Shore hardness of between about 50 and 90, preferably at least close to 75.

The sealing means of the improved apparatus can further include a film of a suitable friction reducing material (such as a lacquer, especially PTFE) which is applied at least to the radially inner section of the partition and is contacted by the lip or lips of such sealing means.

The novel features which are considered as characteristic of the invention are set forth in particular in the appended claims. The improved torsional vibration damping apparatus itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a fragmentary axial sectional view of a vibrations damping apparatus which embodies one presently preferred form of our invention and can be utilized with advantage between a prime mover and a friction clutch in the power train of a motor vehicle;

FIG. 2 is an enlarged view of a detail in the apparatus of FIG. 1; and

FIG. 3 illustrates the structure of FIG. 2 but with the lips of the sealing means in deformed condition.

DESCRIPTION OF PREFERRED EMBODIMENTS

The apparatus 1 which is shown in FIG. 1 can serve to damp torsional vibrations between a rotary output element OE (such as a crankshaft or a camshaft of a combustion engine in the power train of a motor vehicle) and a coaxial rotary input element IE (e.g., the input shaft of a change-speed transmission in the aforementioned power train). The character 2 denotes a first rotary torque transmitting device which is arranged to normally receive torque from the output element OE and to transmit torque to a coaxial second torque transmitting device 4. The latter can transmit torque to the input element IE preferably by way of a customary friction clutch, not shown. The direction of power flow is reversed (i.e., the element IE transmits torque to the element OE) when the motor vehicle embodying the power train including the apparatus 1 of FIG. 1 is coasting. The means for transmitting torque between the devices 2 and 4 comprises a torsional vibration damper 15. The latter operates between a flywheel 3 of the device 2 and a coaxial flywheel 5 of the device 4.

The apparatus 1 constitutes a modification of and an improvement over those disclosed in published German patent applications Serial Nos. 197 28 422 A1, 196 03 248 A1, 195 22 718 A1, 41 17 582 A1, 41 17 581 A1 and 41 17 579 A1. Apparatus of the type disclosed in the just enumerated published German patent applications are know as twin-mass or dual-mass flywheels. Reference may also be had to commonly owned U.S. Pat. No. 5,382,193 granted Jan. 17, 1995 to Friedmann et al. for "APPARATUS FOR DAMPING VIBRATIONS".

The flywheel or mass 3 of the torque transmitting device 2 comprises a first sidewall 6 which extends substantially radially of the common axis 25 of the elements OE, IE and the radially inner portion of which carries a hub 7 affixed to the output element OE by fasteners (not shown) having shanks extending through registering axially parallel holes 9 provided therefor in the hub 7, sidewall 6 and output element OE. A portion of the hub 7 is surrounded by an antifriction ball bearing 8 which, in turn, is surrounded by the radially innermost portion of the flywheel 5. The bearing 8 surrounds a portion of the input element IE which receives torque from the torque transmitting device 4 when the engine drives the device 2 and the non-illustrated friction clutch between the flywheel 5 and the input element IE is at least partially engaged. The antifriction ball bearing 8 can be replaced with another antifriction bearing or with a friction bearing or slide bearing, e.g., of the type disclosed in published German patent applications Serial Nos. 198 34 728 A1 and 198 34 729 A1.

The hub 7 and the sidewall 6 of the illustrated torque transmitting device 2 constitute two discrete parts of the flywheel 3. However, it is within the purview of the present invention to make the sidewall 6 of one piece with the hub 7. The aforementioned fasteners (such as bolts) which extend through the registering openings or holes of the parts OE, 6 and 7 are installed radially outwardly of the bearing 8 and the heads of such fasteners are accessible through windows 10 (only one shown in FIG. 1) which are provided in the radially inner portion of the flywheel 5. Such arrangement renders it possible to assemble the parts of the apparatus 1 into a module which can be conveniently and rapidly mounted on or detached from the output element OE of the prime mover (such as the aforementioned combustion engine of a motor vehicle).

The radially outermost portion 11 of the sidewall 6 is a short cylinder which is coaxial with the flywheel 5 and surrounds the radially outer part of an annular chamber 14. The cylindrical portion 11 can constitute a separately produced part which is welded or otherwise reliably affixed to the sidewall 6; such cylindrical portion 11 constitutes or forms part of a means for sealing the radially outermost part of the chamber 14 and further serves to support an annular starter gear 12. The latter is actually mounted (e.g., a press fit) on a ring-shaped auxiliary or additional flywheel or mass 12*a* which, in turn, is welded or otherwise reliably affixed to the cylindrical portion 11 (i.e., to the sidewall 6). Still further, the portion 11 of the sidewall 6 carries (e.g., it is welded to) a second sidewall 13 which constitutes a further component of the flywheel 3 (i.e., of the device 2) and is substantially parallel with the radially outer portion of the sidewall 6.

The sidewalls 6, 13 flank the annular chamber 14 and seal its radially outermost part. The radially inner part of this chamber is open to the extent necessary to provide room for insertion of an annular disc-shaped partition or flange 17 (hereinafter called partition). More specifically, the chamber 14 receives a set of radially outwardly extending projections or arms 16 which together constitute a composite radially outer section of the partition 17 and extend radially outwardly from an annular washer-like circumferentially complete radially inner section 29 of the partition. The arms 16 form part (namely the output part) of the damper 15 which is installed in the chamber 14 and further includes a ring-shaped array of arcuate or straight energy storing elements 22 of the damper. The energy storing element 22 which is shown in FIG. 1 is an arcuate coil spring which is received in the radially outer part of the chamber 14. The energy storing elements 22 react against suitably configured and distributed portions or abutments 20, 21 of the sidewalls 6, 13 and bear upon the arms 16 (or vice versa) to oppose angular displacements of the torque transmitting devices 2, 4 relative to each other. To this end, the circumferentially complete annular washer-like radially inner section 29 of the partition 17 is non-rotatably affixed to the mass 5 of the torque transmitting device 4 by rivets 18 and/or in any other suitable manner.

The chamber 14 is at least partially filled with a suitable lubricant. FIG. 1 shows that the radially outer part of the chamber 14 is filled with grease (this is indicated at 14A). A friction clutch which can be utilized to transmit torque between the torque transmitting device 4 and the input element IE of the transmission is disclosed in the aforementioned U.S. Pat. No. 5,382,193 to Friedmann et al. The arrangement is preferably such that the clutch disc or clutch plate of the clutch is affixed to the input element IE and drives this input element when it is frictionally engaged by the pressure plate and the counterpressure plate of the clutch. The latter can constitute a manually or automatically engageable clutch.

The aforementioned abutments 20, 21 for the energy storing elements 22 are suitably deformed (such as upset or depressed) portions of the respective sidewalls 6 and 13. However, it is also possible to employ separately produced abutments which are riveted, welded or otherwise affixed to the sidewalls 6 and 13. Reference may be had again to the aforementioned U.S. Pat. No. 5,382,193 to Friedmann et al. (see the abutments 55, 55*a* in FIG. 1 of this patent). The energy storing elements 22 can constitute coil springs which are imparted an arcuate shape (to readily enter the radially outer part of the annular chamber 14) prior to insertion into such chamber. The energy storing elements 22 can be installed to operate in series. If such energy storing elements include coil springs, each such energy storing element can include an outer coil spring and at least one inner coil spring which is confined in the outer coil spring. Reference may be had, for example, to the aforementioned published German patent applications Serial Nos. 196 48 342 A1 and 196 03 248 A1.

In accordance with a feature of the present invention, the means for sealing the radially inner part of the annular chamber 14 comprises two annular seals 23, 24 which are mirror images of each other with reference to a plane normal to the axis 25 and including the ring-shaped washer-like radially inner section 29 of the partition 17. Each of the seals 23, 24 comprises an annular carrier 26 which is borne by the respective sidewall 6, 13, and a deformable annular sealing lip 28 provided on the respective carrier 26 and sealingly engaging the adjacent side or surface of the radially inner section 29 of the partition 17. FIGS. 1 and 2 show the sealing lips 28 in underformed condition; these lips assume such conditions prior to insertion of the arms 16 of the partition 17 into the chamber 14. Once the damper 15 is properly assembled and installed in the chamber 14, the lips 28 of the two annular seals 23, 24 assume the positions shown in FIG. 3; such lips then bear upon adjacent sides or surfaces of the inner section 29 of the partition 17 with a force which is required to seal the radially inner part of the annular chamber 14 against escape of the flowable contents (14A) and/or against entry of dust and/or other foreign matter.

The seals 23, 24 are coaxial with the torque transmitting devices 2, 4, i.e., with the elements OE and IE. It is often sufficient to employ one of the seals 23, 24 and to maintain the radially inner section 29 of the partition 17 in direct sealing engagement with the adjacent side or surface of the sidewall 6 or 13.

An advantage of pairs of seals (23, 24) which are mirror images of each other is that they can be produced by resorting to a single set of tools or other implements. The carriers 26 are annular washer-like bodies which are secured to the respective sidewalls 6, 13 by connectors 31 each of which includes a rivet 32 forming part of the respective sidewall and having a shank extending through a hole in the respective carrier. The ends of such shanks are upset to constitute heads at those sides of the carriers 26 which confront the arms 16 of the partition 17.

Each carrier 26 has axially offset annular radially innermost and radially outermost sections. The outermost sections of the carriers 26 are adjacent the arms 16 of the partition 17, and the innermost sections 27 of such carriers mount the respective annular lips 28. Each such lip has an annular bead 30 which abuts the adjacent side of the respective sidewall 6, 13 radially inwardly of the annular array of connectors 31. The radially innermost portions of the lips 28 bear against the respective sides of the radially inner section 29 of the partition 17. Each lip 28 includes a radially innermost portion which is part of a conical frustum (as actually shown in FIGS. 1 to 3) or part of a dished structure and is configured and dimensioned in such a way that it undergoes additional deformation under the action of centrifugal force if the rotational speed of the torque transmitting device 2 (i.e., of the output element OE) is increased. This will be appreciated by bearing in mind that increasing centrifugal force urges the radially innermost portions of the lips 28 radially outwardly (see the arrow 36 in FIG. 3) so that the bias of these lips upon the adjacent sides or surfaces of the inner section 29 of the partition 17 increases accordingly.

The illustrated cross-sectional outlines of the carriers 26 have been found to be highly desirable and advantageous because they contribute to rigidity and stability (shape retaining ability) of such parts. The lips 28 are at least slightly deformable (preferably elastic) so that they can undergo at least some deformation (preferably axially as well as radially of the respective sidewalls 6 and 13) when the apparatus 1 is fully assembled and properly installed between the output element OE and input element IE. The magnitude of the desired or required sealing and frictional forces acting between the lips 28 on the one hand, and the inner part 29 of the partition 17 on the other hand, can be readily selected and regulated in several ways including selection of the dimensions and/or configuration of the lips, the material of the lips, and the loci of mounting of the lips relative to the respective sidewalls and relative to the inner section 29 of the partition 17.

Frictional hysteresis which develops as a result of frictional engagement between the lips 28 and the section 29 of the partition 17 acts in parallel with the energy storing elements 22 of the damper 15.

In order to further enhance the reliability and duration of frictional engagement between the lips 28 and the inner section 29 of the partition 17, at least those portions of the surfaces of the section 29 which are in contact with the lips 28 are provided with films, layers and/or other coats 35 of a friction reducing material. Such material can constitute or include a lacquer, e.g., polytetrafluorethylene (PTFE). The application of such friction reducing films 35 entails a pronounced reduction of wear upon the lips 28, i.e., it prolongs the useful life of the lips. Otherwise stated, the films 35 bring about a reduction of friction value or sliding friction coefficient between the parts 28 on the one hand, and the inner section 29 of the partition 17 on the other hand.

FIGS. 1 to 3 show that the lips 28 are connected to the radially inner portions 27 of the respective carriers 26, i.e., to those portions of the carriers which are nearest to the axis 25. However, it is equally possible to provide additional lips 28 (or similar or analogous lips) on the radially outermost portions of the carriers 26 in addition to or in lieu of the illustrated lips. As already mentioned above, it is advisable to configurate and mount the lips 28 and/or their equivalents in such a way that their sealing action is enhanced (increases) with increasing RPM of the torque transmitting device 2. In the illustrated embodiment, the conicity of those portions of the lips 28 which bear upon the respective films 35 of friction reducing material increases under the action of centrifugal force (arrow 36 in FIG. 3) when the RPM of the torque transmitting device 2 is increased.

It is further possible to initially select a desired optimum frictional (sealing) engagement between the lips 28 and the radially inner part 29 of the partition 17 in such a way that it can and preferably should remain unchanged for extended periods of time, e.g., during the entire useful life of the apparatus 1. This can be accomplished by designing and installing the lips 28 in such a way that their sealing action at the radially innermost part of the annular chamber 14 is not affected (altered) in response to changes in the magnitude of centrifugal force (arrow 36 in FIG. 3). All that is necessary is to reinforce the lips 28, to replace the illustrated lips with lips which cannot be deformed (or cannot be deformed to an appreciable extent) by centrifugal force and/or by configurating the carriers 26 and/or the sidewalls 6, 13 in such a way that they can effectively oppose centrifugal force-induced deformation of the lips (namely in a sense that the centrifugal force would be free to change the extent of frictional engagement between the lips and the partition). The reason for elimination of the influence of centrifugal force upon sealing engagement between the lips and the partition is that, if such sealing engagement is proper to start with, any changes would entail leakage between the chamber 14 and the surrounding atmosphere or excessive wear upon the parts 28 and 29.

The beads 30 constitute optional but desirable (advantageous) features of the seals 23 and 24. The illustrated beads (which are of one piece with the respective lips 28) can be replaced with beads or with analogous formations which are affixed to or form part of the respective carriers 26 and/or sidewalls 6, 13 and bear upon the respective lips 28.

The illustrated embodiments of the seals 23, 24 are desirable and advantageous because the making of the beads 30 of one piece with the lips 28 reduces the cost of the seals and of the entire apparatus 1. The placing of the beads 30 between the carriers 26 and the respective sidewalls 6, 13 ensures the establishment of even more reliable sealing action at the radially inner part of the annular chamber 14. Thus, the lips 28 establish a reliable sealing action directly with the respective sides or surfaces of the radially inner section 29 of the partition 17, and the beads 30 establish an equally satisfactory (i.e., reliable) sealing action between the lips 28 and the respective sidewalls 6, 13. The establishment (via beads 30) of reliable fluidtight seals between the carriers 26 and the respective sidewalls 6, 13 constitutes a desirable and advantageous feature of the improved apparatus 1.

The lips 28 and their beads 30 can be more or less permanently affixed to the respective carriers 26 in a suitable injection molding machine. Such undertaking can be simplified by properly selecting the materials of the constituents (26 and 28, 30) of the composite seals 23 and 24. Suitable materials for the lips 28 and their beads 30 are thermoplastic substances which exhibit a certain amount of elasticity and, even more preferably, elastomeric substances. It has been found that highly satisfactory combinations of lips 28 with beads 30 can be made of a rubber-like substance such as, for example, fluorocaoutschouc, fluorosilicon caoutchouc or silicone caoutchouc.

The illustrated connecting means 31 (which employ rivets 32 of one piece with the respective sidewalls 6 and 13) can be replaced with welded or other bonded connecting means without departing from the spirit of the present invention. If the carriers 26 are welded (or otherwise bonded) to the respective sidewalls 6 and/or 13, such connecting means can constitute circumferentially complete annuli. This renders it possible to dispense with the rivets 32 or with analogous mechanical connecting means 31 as well as with the beads 30 because a circumferentially complete welded joint necessarily establishes a fluidtight seal between the entire carrier 26 and the respective sidewall 6, 13. The sidewalls 6, 13 are or can be made of a suitable metallic material. If the carriers 26 are welded to the respective sidewalls 6 and 13, such operation is (or can be) carried out by resorting to a laser beam welding technique. An advantage of such procedure is that the rise in temperature at the connections between the carriers 26 and the respective sidewalls 6, 13 can be maintained within an acceptable range; this greatly reduces the likelihood of heat-induced damage to the seals, particularly to the lips 28.

The number of rivets 32 between each of the carriers 26 and the respective sidewall 6, 13 can vary within a wide range, depending to a considerable extent upon the rigidity (stability) of the carriers. These rivets are preferably equidistant from each other as seen in the circumferential direction of the respective carriers 26. The number of rivets 32 (or analogous mechanical connectors) can be as small as three but preferably much higher (e.g., between 6 and 30, most preferably in the range of 24).

The strengths of the connections between the carriers 26 and the respective lips 28 can be greatly enhanced by providing the carriers with suitable sockets, through holes, recesses and like cavities which are filled with the normally or preferably plastic material of the lips. Once the plastic material sets, the thus established bonds between the carriers and the respective lips can readily stand the stresses which are anticipated in actual use of the improved combined torque transmitting and torsional vibration damping apparatus. It is clear that the just described mode of bonding the illustrated carriers 26 (or equivalent carriers) to the respective lips 28 can be reversed by causing some material of the carriers to penetrate into suitably configured recesses (such as undercut blind holes) in the bodies of the lips, or that one can resort simultaneously to an interfitting of female parts of the carriers with male parts of the lips and of male parts of the carriers with female parts of the lips.

Referring again to the illustrated damper 15, the coil springs 22 or their equivalents can be configured, dimensioned and installed in such a way that, proceeding from a starting or neutral position, they permit angular displacements of the torque transmitting device 2 through angles of up to and well in excess of 30° relative to the torque transmitting device 4 and/or vice versa. The direction of such angular displacement depends upon the nature of movement of the motor vehicle, i.e., whether the prime mover (such as an internal combustion engine) is pulling a load (namely the vehicle, its cargo and its occupant or occupants) or the vehicle is coasting (e.g., by rolling along a downwardly sloping road surface so that the engine acts as a brake and its output element OE is driven by the damper 15).

For example, the length of each energy storing element 22 can be between 6 and 20 times the diameter of its convolutions. The resistance of energy storing elements 22 to deformation (i.e., their so-called torsional spring rate= resistance to twisting) can amount to between 1 and 6 Nm/° (at least at the start of compression from a starting condition). Such resistance to deformation can increase in response to progressing deformation of the energy storing elements 22. Each of these energy storing elements can constitute a coil spring which is designed to stand compressive as well as or tensional stresses. If the elements 22 are coil springs which are (or which are expected to be) called upon to stand tensional stresses, or which must stand compressive as well as tensional stresses, at least one end convolution of each such spring must be properly connected to at least one of the torque transmitting elements (such as one of the arms 16 and/or one of the abutments 20, 21).

It is often desirable to employ energy storing elements (22) in the form of coil springs extending along arcs of close to 180° so that as few as two coil springs of such length suffice to adequately fill the radially outer part of the annular chamber 14. Furthermore, it is possible to employ sets or groups of coil springs wherein an outer coil spring confines an inner coil spring. Reference may be had, for example, to U.S. Pat. No. 5,161,660 granted Nov. 10, 1992 to Huber for "CLUTCH PLATE WITH PLURAL DAMPERS" as well as to the aforementioned published German patent applications Serial Nos. 196 48 342 A1 and 196 03 248 A1.

It is also possible to employ a damper whose versatility greatly exceeds that of a damper employing a single set of identical coil springs such as the coil spring 22 shown in FIG. 1. For example, at least one of the springs can have a considerable length (i.e., it can be compressible and expansible within a wide range) and can be assembled of a row or series of successive shorter springs (such as coil springs), and at least one such spring can constitute a composite spring wherein at least one first coil spring having small-diameter convolutions is confined in a second coil spring having larger-diameter convolutions, i.e., wherein at least one inner spring is encapsulated in an outer spring.

The lips 28 are preferably made of a plastic material other than the material of the carriers 26. Thus, the lips 28 can be made of a thermoplastic or thermosetting or elastomeric material. It is also possible to employ composite seals 23, 24 each of which can consist of two or more different plastic materials (e.g., a thermoplastic and an elastomeric material). It is often preferred or advisable to employ a plastic material which exhibits satisfactory mechanical properties at elevated temperatures. For example, the material or materials of the seals 23, 24 should be capable of standing temperatures in the range above 160° C., preferably in excess of 200° C. As concerns such characteristics of various plastic substances, reference can be had, for example, to pages 215–221 of "Kraftfahrzeugtechnisches Taschenbuch" (meaning "Technical Pocketbook of the Motor Vehicle industry"), published in 1995 by VDI-Verlag, Düsseldorf, Federal Republic Germany (ISBN 3-18-419122).

For example, the carriers 28 can be made of a metallic material or of a hard or relatively hard plastic material, and the lips 28 can be made of an elastic plastic material.

The material of the lips can have a Shore hardness of between about 50 and 90; a presently preferred Shore hardness at least approximates 75.

The improved apparatus can comprise more than two torque transmitting devices each of which includes or can include or constitutes at least one flywheel. Reference may be had again to the aforementioned US and foreign patents and patent applications.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers for use in the power trains of motor vehicles and the like and, therefore, such adaptations should and are intended to be comprehended within the meaning and range of equivalence of the appended claims.

What is claimed is:

1. Apparatus for damping vibrations between coaxial rotary output and input elements, comprising:
    a first rotary torque transmitting device coaxial with and arranged to receive torque from said output element;
    a second rotary torque transmitting device coaxial with and arranged to transmit torque to said input element, one of said devices comprising at least two sidewalls rotatable with each other and bounding an annular chamber having a sealed radially outer part and a radially inner part;
    a partition including a radially outer section in said chamber and a ring-shaped radially inner section extending substantially radially inwardly beyond the inner part of said chamber and connected for rotation with the other of said devices;
    energy storing means provided in said chamber and arranged to yieldably oppose rotation of said one device and said partition relative to each other; and
    means for sealing said inner part of said chamber, including at least one rigid annular carrier borne by one of said sidewalls and an elastically deformable annular sealing lip provided on said carrier, wherein the sealing lip is biased by its own elasticity to sealingly engage said ring-shaped inner section of said partition, said carrier consisting of a first material and said lip consisting of a different second material.

2. Apparatus for damping vibrations between coaxial rotary output and input elements, comprising:
    a first rotary torque transmitting device coaxial with and arranged to receive torque from said output element;

a second rotary torque transmitting device coaxial with and arranged to transmit torque to said input element, one of said devices comprising at least two sidewalls rotatable with each other and bounding an annular chamber having a sealed radially outer part and a radially inner part;

a partition including a radially outer section in said chamber and a ring-shaped radially inner section extending substantially radially inwardly beyond the inner part of said chamber and connected for rotation with the other of said devices;

energy storing means provided in said chamber and arranged to yieldably oppose rotation of said one device and said partition relative to each other; and means for sealing said inner part of said chamber, including at least one rigid annular carrier borne by one of said sidewalls and an elastically deformable annular sealing lip provided on said carrier, wherein the sealing lip is biased by its own elasticity to sealingly engage said ring-shaped inner section of said partition, said carrier consisting of a first material and said lip consisting of a different second material, wherein said inner section of said partition has a first side sealingly engaged by said lip and a second side, said means for sealing further including an additional carrier borne by the other of said sidewalls and an additional elastically deformable annular sealing lip provided on said additional carrier, wherein the additional sealing lip is biased by its own elasticity to sealingly engage the second side of said inner section of said partition, said additional carrier consisting of said first material and said additional lip consisting of said second material.

3. The apparatus of claim 2, wherein said carriers and said lips are respectively mirror images of each other with reference to a plane normal to the common axis of said torque transmitting devices.

4. The apparatus of claim 1, wherein said lip is of one piece with said carrier.

5. The apparatus of claim 1, wherein said carrier includes radially inner and radially outer annular portions, said lip being provided on said radially inner annular portion of said carrier.

6. The apparatus of claim 1, wherein said lip is deformed as a result of sealing engagement with said ring-shaped inner section of said partition, said lip having at least one at least substantially frustoconical portion, at least in the underformed condition thereof.

7. The apparatus of claim 1, wherein said lip is deformed as a result of sealing engagement with said ring-shaped inner section of said partition, said lip having at least one at least substantially dished portion, at least in the undeformed condition thereof.

8. The apparatus of claim 1, wherein said lip includes an annular portion which is in sealing engagement with said inner section of said partition and is offset relative to said carrier in the direction of common axis of said devices.

9. The apparatus of claim 1, wherein one of said carrier and said lip includes at least one annular bead at said one sidewall.

10. The apparatus of claim 9, wherein said at least one bead is deformable and sealingly engages and is deformed by said one sidewall.

11. The apparatus of claim 1, wherein said second material is elastic and said lip is deformed by said one sidewall in the direction of the common axis of said devices.

12. The apparatus of claim 1, wherein said one device is rotatable at a plurality of different speeds and said lip is configurated to undergo progressing deformation under the action of centrifugal force in response to increasing rotational speed of said one device.

13. The apparatus of claim 12, wherein said lip is arranged to undergo progressing deformation axially and radially of said sidewalls in response to increasing rotational speed of said one device.

14. The apparatus of claim 1, wherein said carrier is fixedly secured to said one sidewall.

15. The apparatus of claim 1, wherein said carrier is bonded to said one sidewall.

16. The apparatus of claim 1, further comprising means for connecting said carrier to said one sidewall.

17. Apparatus for damping vibrations between coaxial rotary output and input elements, comprising:

a first rotary torque transmitting device coaxial with and arranged to receive torque from said output element;

a second rotary torque transmitting device coaxial with and arranged to transmit torque to said input element, one of said devices comprising at least two sidewalls rotatable with each other and bounding an annular chamber having a sealed radially outer part and a radially inner part;

a partition including a radially outer section in said chamber and a ring-shaped radially inner section extending substantially radially inwardly beyond the inner part of said chamber and connected for rotation with the other of said devices;

energy storing means provided in said chamber and arranged to yieldably oppose rotation of said one device and said partition relative to each other; and means for sealing said inner part of said chamber, including at least one rigid annular carrier borne by one of said sidewalls and an elastically deformable annular sealing lip provided on said carrier, wherein the sealing lip is biased by its own elasticity to sealingly engage said ring-shaped inner section of said partition, said carrier consisting of a first material and said lip consisting of a different second material, wherein the apparatus further comprises means for connecting said carrier to said one sidewall, and wherein said connecting means comprises at least one rivet.

18. Apparatus for damping vibrations between coaxial rotary output and input elements,comprising:

a first rotary torque transmitting device coaxial with and arranged to receive torque from said output element;

a second rotary torque transmitting device coaxial with and arranged to transmit torque to said input element, one of said devices comprising at least two sidewalls rotatable with each other and bounding an annular chamber having a sealed radially outer part and a radially inner part;

a partition including a radially outer section in said chamber and a ring-shaped radially inner section extending substantially radially inwardly beyond the inner part of said chamber and connected for rotation with the other of said devices;

energy storing means provided in said chamber and arranged to yieldably oppose rotation of said one device and said partition relative to each other; and means for sealing said inner part of said chamber, including at least one rigid annular carrier borne by one of said sidewall sand an elastically deformable annular sealing lip provided on said carrier, wherein the sealing lip is biased by its own elasticity to sealingly engage said ring-shaped inner section of said partition, said carrier consisting of a first material and said lip consisting of a different second material, wherein the apparatus further comprises means for connecting said carrier to said one sidewall, and wherein said connecting means comprises rivets each of which is of one piece with at least one of said carrier and said one sidewall.

19. The apparatus of claim 1, wherein said second material is a plastic material.

20. The apparatus of claim 1, wherein said second material is an elastomer.

21. The apparatus of claim 1, wherein said second material is rubber.

22. The apparatus of claim 1, wherein said second material is fluorocaoutschouc.

23. The apparatus of claim 1, wherein said second material is fluorosilicon caoutchouc.

24. The apparatus of claim 1, wherein said second material is silicone caoutchouc.

25. The apparatus of claim 1, wherein said second material has a Shore hardness of between about 50 and 90.

26. The apparatus of claim 25, wherein said Shore hardness at least approximates 75.

27. Apparatus for damping vibrations between coaxial rotary output and input elements, comprising:

a first rotary torque transmitting device coaxial with and arranged to receive torque from said output element;

a second rotary torque transmitting device coaxial with and arranged to transmit torque to said input element, one of said devices comprising at least two sidewalls rotatable with each other and bounding an annular chamber having a sealed radially outer part and a radially inner part;

a partition including a radially outer section in said chamber and a ring-shaped radially inner section extending substantially radially inwardly beyond the inner part of said chamber and connected for rotation with the other of said devices;

energy storing means provided in said chamber and arranged to yieldably oppose rotation of said one device and said partition relative to each other; and means for sealing said inner part of said chamber, including at least one rigid annular carrier borne by one of said sidewalls and an elastically deformable annular sealing lip provided on said carrier, where in the sealing lip is biased by its own elasticity to sealingly engage said ring-shaped inner section of said partition, said carrier consisting of a first material and said lip consisting of a different second material, wherein the apparatus further comprises a film of friction reducing material provided on said partition and contacting said lip.

28. The apparatus of claim 27, wherein said friction reducing material is a lacquer.

29. The apparatus of claim 28, wherein said lacquer consists of polytetrafluorethylene.

* * * * *

UNITED STATES PATENT AND TRADEMARK OFFICE
CERTIFICATE OF CORRECTION

PATENT NO.    : 6,620,048 B2
DATED         : September 16, 2003
INVENTOR(S)   : Achim Gillmann et al.

It is certified that error appears in the above-identified patent and that said Letters Patent is hereby corrected as shown below:

<u>Title page,</u>
Item [75], Inventors, delete "Achinm Gillmann" and substitute -- Achim Gillmann --.

Signed and Sealed this

Twenty-fifth Day of May, 2004

JON W. DUDAS
*Acting Director of the United States Patent and Trademark Office*